(12) United States Patent
Meacham et al.

(10) Patent No.: US 7,731,426 B2
(45) Date of Patent: Jun. 8, 2010

(54) ROTOR SUPPORTS AND SYSTEMS

(75) Inventors: Walter L. Meacham, Phoenix, AZ (US); Paul B. Talbert, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 469 days.

(21) Appl. No.: 11/741,033

(22) Filed: Apr. 27, 2007

(65) Prior Publication Data
US 2008/0267766 A1 Oct. 30, 2008

(51) Int. Cl.
*F16C 27/00* (2006.01)

(52) U.S. Cl. ................. 384/535; 384/311; 384/581

(58) Field of Classification Search ............. 384/215, 384/311, 535–536, 581; 415/104, 170.1, 415/229, 204 A, 226.1
See application file for complete search history.

(56) References Cited

U.S. PATENT DOCUMENTS

| | | | |
|---|---|---|---|
| 2,506,404 A | | 5/1950 | Woodfield et al. |
| 3,005,668 A | * | 10/1961 | Szydlowski ............... 384/535 |
| 3,011,840 A | * | 12/1961 | Littleford .................. 384/581 |
| 3,727,998 A | * | 4/1973 | Haworth et al. ........... 384/215 |
| 3,960,418 A | * | 6/1976 | Bracken .................. 384/535 |
| 4,027,931 A | * | 6/1977 | Streifert .................. 384/311 |
| 4,084,861 A | * | 4/1978 | Greenberg et al. ........ 384/99 |
| 4,214,796 A | | 7/1980 | Monzel et al. |
| 4,451,110 A | * | 5/1984 | Forestier et al. ........... 384/582 |
| 4,764,034 A | | 8/1988 | Fust et al. |
| 4,971,456 A | | 11/1990 | Hori |
| 5,088,840 A | * | 2/1992 | Radtke .................... 384/535 |
| 5,201,585 A | | 4/1993 | Gans et al. |
| 5,738,445 A | | 4/1998 | Gardner |
| 5,810,668 A | | 9/1998 | Graham et al. |
| 5,862,706 A | * | 1/1999 | Chen et al. ............... 384/536 |
| 6,439,772 B1 | * | 8/2002 | Ommundson et al. ...... 384/99 |
| 6,682,219 B2 | | 1/2004 | Alam et al. |
| 7,546,742 B2 | * | 6/2009 | Wakeman et al. .......... 60/796 |
| 2002/0067870 A1 | | 6/2002 | Ommundson et al. |
| 2006/0083449 A1 | | 4/2006 | Laurant et al. |

FOREIGN PATENT DOCUMENTS

JP         2006009662 A   *  1/2006

* cited by examiner

*Primary Examiner*—Marcus Charles
(74) *Attorney, Agent, or Firm*—Ingrassia Fisher & Lorenz, P.C.

(57) ABSTRACT

A rotor support includes a first ring disposed around a first axis, a second ring disposed around the first axis downstream from the first ring, and a plurality of beams extending between the first and the second rings. Each beam is configured to provide an axial stiffness, when an axial force is exerted on the first ring, and a radial stiffness, when a radial force is exerted on the first ring. Each beam has a height extending parallel to a second axis and a width extending parallel to a third axis. The beams are distributed around the first ring to provide a substantially uniform circumferential axial stiffness around the rotor support, and the height of each beam is greater than the width of each beam. Damping can be provided by the placement of a damper between the rotor support and the support housing.

20 Claims, 7 Drawing Sheets

ROTOR SUPPORTS AND SYSTEMS

TECHNICAL FIELD

The inventive subject matter relates to rotor supports and, more particularly, to rotor supports that may be used in a gas turbine engine.

BACKGROUND

Synchronous vibration is common in a rotating system and is usually caused by a rotating mass imbalance. Imbalance frequently occurs when a rotor of the rotating system has a mass center that is not coincident with its geometric center. Another form of vibration is non-synchronous rotor whirl, which occurs when a radial deflection of the rotor results in a tangential force normal to the deflection. The magnitude of the tangential force increases with the deflection. The rotating system can become unstable if there is insufficient damping of the aforementioned vibrations.

Both of these types of vibration are undesirable in a gas turbine engine and other types of turbo-machinery. To control these types of vibrations, a properly designed rotor support system that provides sufficient radial stiffness and damping are employed. The rotor support system may include bearings and a rotor support used to support the rotating rotor to a static housing, and a damper.

Various types of bearing can be used, including rolling element bearings. Some bearings may provide a radial interface between the rotor and the static structure, which can result in the bearing carrying only a radial load. Other bearings may additionally provide an axial interface between the rotor and the static structure, resulting in the bearing carrying a radial load and an axial load. To tailor stiffness of a rotor support system supported by rolling element bearings, the bearing(s) may be mounted to a bearing support. The bearing support may be designed to have uniform radial stiffness (i.e., isotropic stiffness) or non-uniform radial stiffness (i.e., anisotropic stiffness). For a rolling element bearing that reacts to axial loads, the bearing support may also have axial stiffness.

The rotor support is typically disposed between the bearings supporting the rotor and the static housing and may be used to compensate for system eccentricities. The rotor support generally includes a forward ring, an aft ring, and a plurality of beams extending therebetween. In one conventional configuration, the beams are each identically formed, thin, hour glass-shaped, and evenly spaced circumferentially around the rings, resulting in isotropic radial stiffness of the rotor. This type of rotor support has a circumferential axial stiffness. In another conventional configuration, the beams are I-shaped and divided into two groups. In this configuration, a first group is disposed on one side of the rings and a second group is located radially opposite from the first group providing anisotropic radial stiffness. This type of rotor support has a non-uniform circumferential axial stiffness.

Dampers of various forms can be placed between the rotor support and the static housing. The damper can be designed to provide the desired damping characteristics to complement the radial stiffness characteristics of the bearing support.

Although these conventional rotor support system configurations operate adequately, they still suffer from drawbacks. In particular, the rotor support and damper configuration including evenly spaced, identically formed, I-shaped beams may not provide sufficient radial stiffness, if rotor whirl occurs. And even though the rotor support including two groups of spaced apart beams improves radial stiffness to increase damping of rotor whirl, it may not provide sufficient circumferential axial stiffness, if the rotor experiences an axial thrust force thereon.

Hence, there is a need for a rotor support that has improved uniform circumferential axial stiffness capabilities over conventional rotor supports while providing radial stiffness and damping characteristics of the conventional configurations. In particular, it is desirable for the rotor support to provide suitable circumferential axial stiffness and to provide suitable radial stiffness and damping to dampen forces that may be exerted on the rotor support forward ring. Additionally, it is desirable for the rotor support and damper to be relatively inexpensive and simple to manufacture. Moreover, it is desirable for the rotor support and damper to be capable of being retrofitted into existing rotating machinery.

BRIEF SUMMARY

The inventive subject matter provides rotor supports for disposal between a support housing and a bearing assembly of an engine.

In one embodiment, and by way of example only, the rotor support includes a first ring disposed around a first axis, a second ring disposed around the first axis and separated from the first ring, and a plurality of beams extending between the first and the second rings. Each beam is configured to provide an axial stiffness, when an axial force is exerted on the first ring, and a radial stiffness, when a radial force is exerted on the first ring. Each beam has a height extending parallel to a second axis and a width extending parallel to a third axis. The beams are distributed around the first ring to provide a uniform circumferential axial stiffness, and the height of each beam is greater than the width of each beam.

In another embodiment, and by way of example only, a rotating system is provided for use in an engine. The system includes a rotor extending along an first axis, a bearing assembly mounted to the rotor, a support housing surrounding the bearing assembly, and a rotor support disposed between the support housing and the bearing assembly. The rotor support includes a first ring disposed around a first axis, a second ring disposed around the first axis and separated from the first ring, and a plurality of beams extending between the first and the second rings. Each beam is configured to provide an axial stiffness, when an axial force is exerted on the first ring, and a radial stiffness, when a radial force is exerted on the first ring. Each beam has a height extending parallel to a second axis and a width extending parallel to a third axis. The beams are distributed around the first ring to provide a uniform circumferential axial stiffness around the first ring, and the height of each beam is greater than the width of each beam.

Other independent features and advantages of the preferred rotor support will become apparent from the following detailed description, taken in conjunction with the accompanying drawings which illustrate, by way of example, the principles of the inventive subject matter.

DETAILED DESCRIPTION OF A PREFERRED EMBODIMENT

The following detailed description of the inventive subject matter is merely exemplary in nature and is not intended to limit the inventive subject matter or the application and uses of the inventive subject matter. It should be understood that the subject matter may be implemented in any machine, such as a turbine or compressor, that has its rotary components mounted upon a generally horizontally extended shaft or any other arrangement where a rotor is capable of exerting a relatively high static load upon the bearing. Additionally, the inventive subject matter applicable for any bearing support assembly. Furthermore, there is no intention to be bound by any theory presented in the preceding background of the inventive subject matter or the following detailed description of the inventive subject matter.

Figure 1:
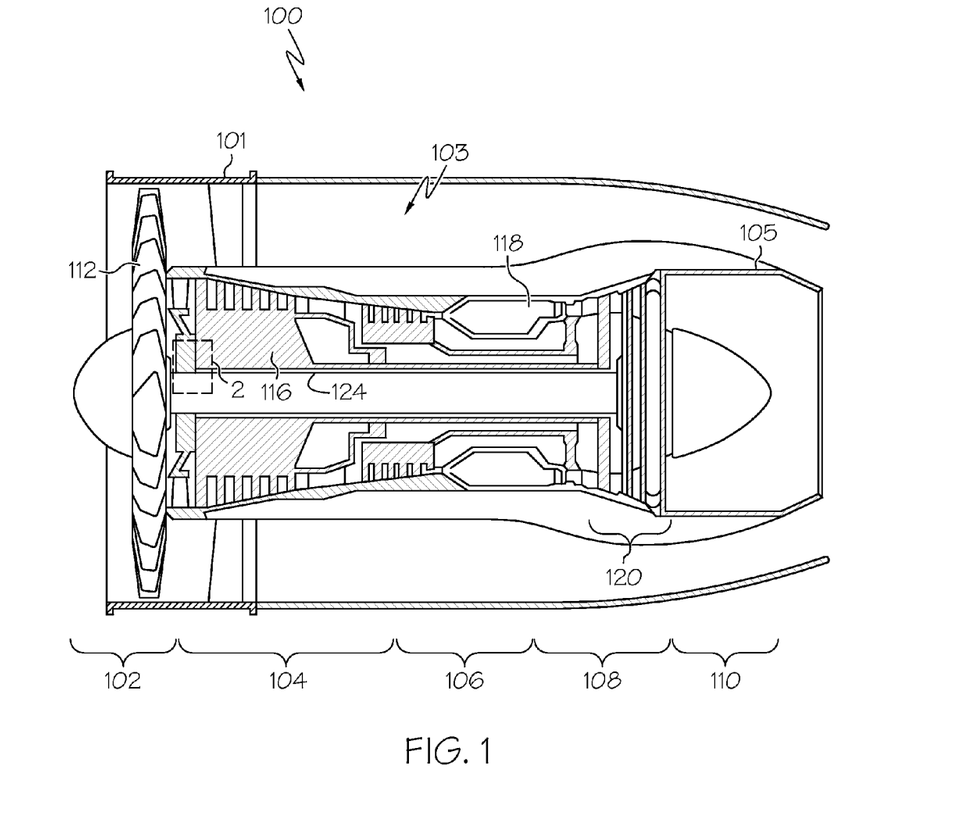
FIG. 1 is a simplified, cross-sectional view of a gas turbine engine, according to an embodiment.

FIG. 1 is a simplified, cross-sectional view of a gas turbine engine 100, according to an embodiment. The engine 100 may be disposed in an engine case 101 and may include a fan section 102, a compressor section 104, a combustion section 106, a turbine section 108, and an exhaust section 110. The fan section 102 may include a fan 112, which draws air into the fan section 102 and accelerates it. A fraction of the accelerated air exhausted from the fan 112 is directed through a bypass section 103 to provide a forward thrust. The remaining fraction of air exhausted from the fan 112 is directed into the compressor section 104.

The compressor section 104 may include series of compressors 116, which raise the pressure of the air directed into it from the fan 112. The compressors 116 may direct the compressed air into the combustion section 106. In the combustion section 106, which includes an annular combustor 118, the high pressure air is mixed with fuel and combusted. The combusted air is then directed into the turbine section 108.

The turbine section 108 may include a series of turbines 120, which may be disposed in axial flow series. The combusted air from the combustion section 106 expands through the turbines 120, causing them to rotate. The air is then exhausted through a propulsion nozzle 105 disposed in the exhaust section 110, providing additional forward thrust. In an embodiment, the turbines 120 rotate to thereby drive equipment in the engine 100 via concentrically disposed shafts or spools. Specifically, the turbines 120 may drive the compressor 116 via one or more rotors 124.

Figure 2:
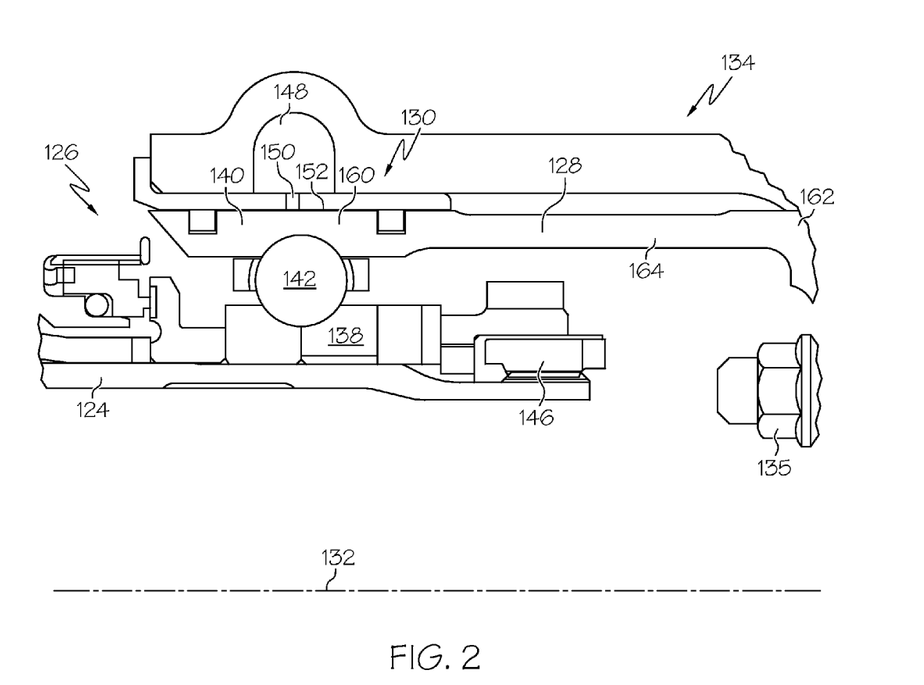
FIG. 2 is a close-up view of an area between a fan section and a compressor section of the engine indicated by a dotted line 2 shown in FIG. 1 in which a rotor support is implemented, according to an embodiment.

FIG. 2 is a close-up view of an area between the fan section 102 and the compressor section 104 indicated by a dotted line 2 shown in FIG. 1, according to an embodiment. The area shows the rotor 124, a bearing assembly 126, a rotor support 128, and a squeeze film damper 130. The components reduce vibration that may occur when the rotors 124 rotate about a first or "primary" axis 132.

The bearing assembly 126 is disposed between a portion of the rotor 124 and a support housing 134 (only a portion of which is shown) that extends or is attached to an engine case (not shown). The bearing assembly 126 maintains the rotor 124 in a desired position during rotation and may be a conventional thrust bearing. In any case, the bearing assembly 126 can be a conventional roller bearing which includes an inner race 138, an outer race 140, and one or more of rolling elements 142, disposed therebetween. The inner race 138 is mounted to the rotor 124, and may be stacked with a stub shaft (not shown) and clamped by a nut 146. The outer race 140, in an embodiment, may make up a first ring 160 of the rotor support 128; however, in other embodiments, the outer race 140 may alternatively be a separate component from the rotor support 128.

The rotor support 128 is configured to form a portion of the squeeze film damper 130, and is therefore mounted between the bearing assembly 126 and the support housing 134. To supply oil to the squeeze film damper 130, the support housing 134 may have an oil supply line to a groove 148 formed therein. The groove 148 may feed oil through multiple feed holes 150 to a hydraulic mount clearance 152, which is formed by a gap between support housing inner diameter and the rotor support 128 and which makes up a portion of the squeeze film damper 130. The squeeze film damper 130 may be configured to be open, closed, or re-circulating.

Figure 5:
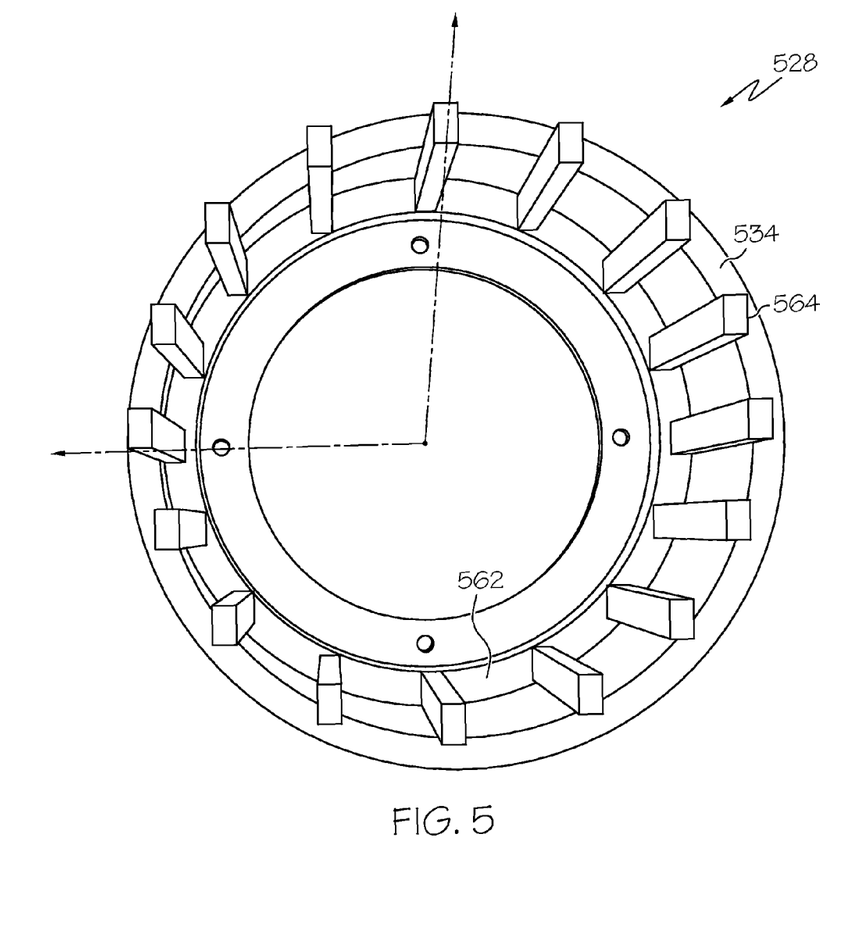
FIG. 5 is an end view of a rotor support with a forward ring of the rotor support removed, according to another embodiment.

The rotor support 128 is also configured to center the rotor 124 inside the hydraulic mount clearance 152. In an embodiment, the rotor support 128 includes a first or "forward" ring 160 (which in this embodiment also acts as the bearing outer race 140), a second or "aft" ring 162, and a plurality of beams, only one 164 of which is shown. The first and second rings 160, 162 are disposed around the first axis 132 and are separated from each other along the axis 132. FIG. 5 is an end view of a rotor support 528 with a first ring of the rotor support 528 removed, according to an embodiment. Here, the rotor support 528 includes a second ring 562 and beams 564 extending from the second ring 526. The outer diameter of the second ring 562 may be off-centered relative to an inner diameter of a support housing 534 surround the second ring 562 and relative to the first ring (not shown). In other words, a center of the second ring 562 may not coincide with a center of the support housing 534. In such an embodiment, the particular dimensions of the offset depend on the vertical stiffness of the support housing 534, which is determined by the weight of the rotor 124. Returning to FIG. 2, in another example, the inner diameter of the support housing 134 may be off-centered to center the rotor 124 relative to the rotor support 128. The beams 164 may be connected to the rings 160, 162 or may be integrally formed therewith.

Figure 3:
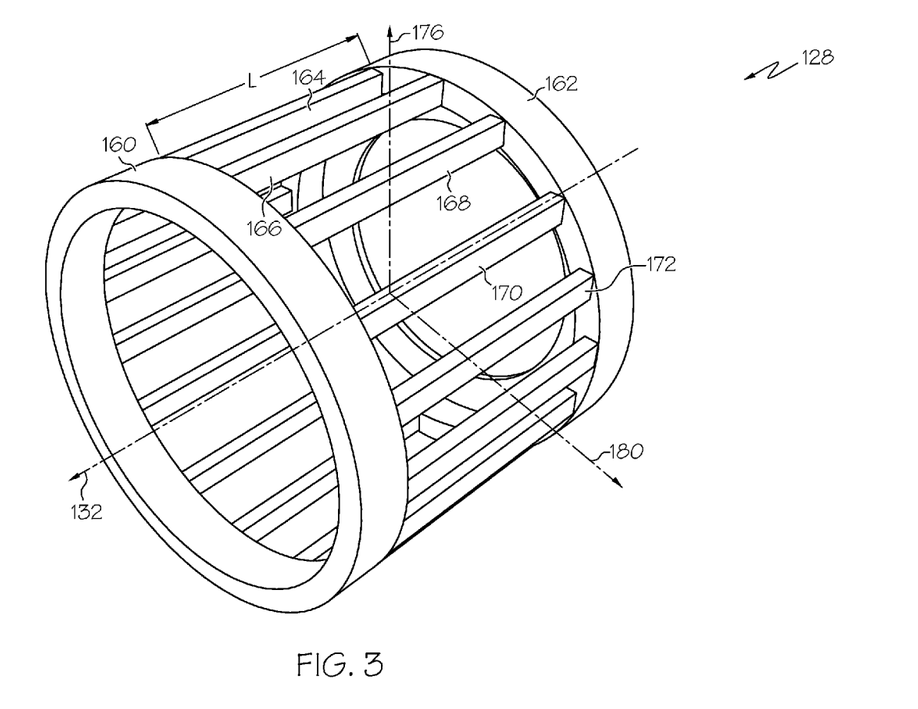
FIG. 3 is a perspective view of a rotor support and damper that may be implemented in a rotor group, according to an embodiment.
Figure 4:
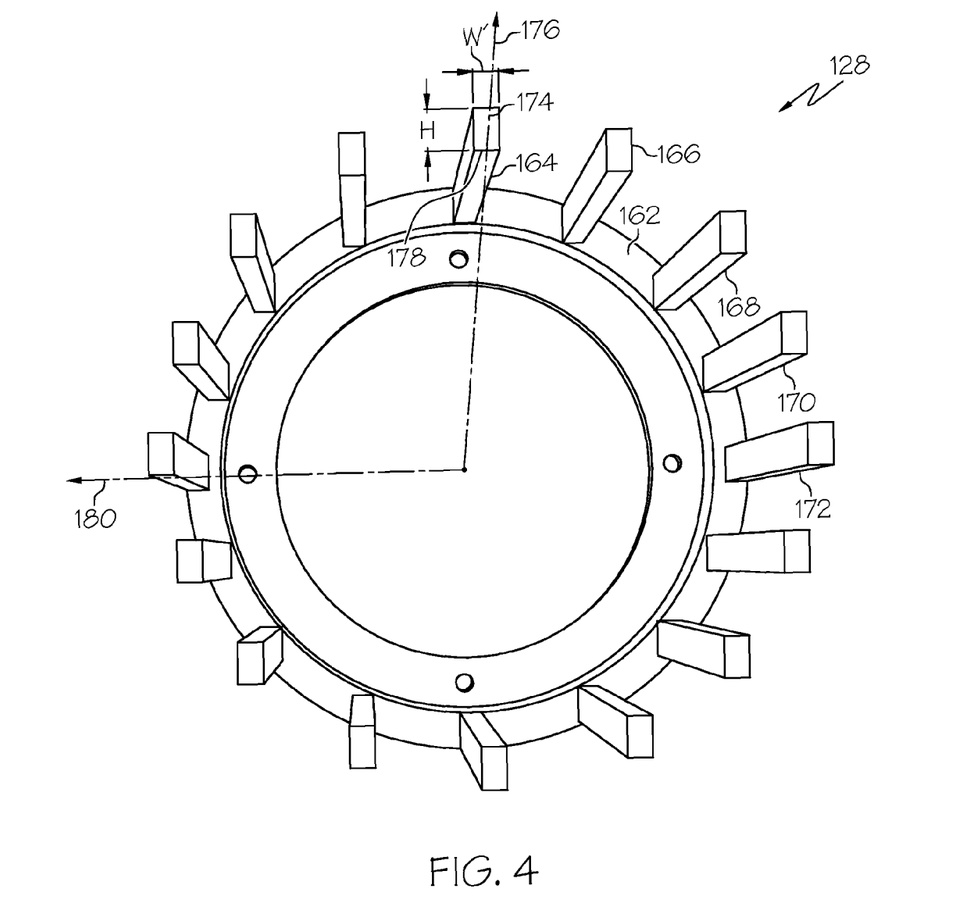
FIG. 4 is an end view of the rotor support shown in FIG. 3 with a forward ring of the rotor support removed, according to an embodiment.

The rotor support 128 may be further configured to provide substantially uniform circumferential axial stiffness and anisotropic support to the bearing assembly 126. As used herein, the term "substantially uniform" may be defined as being within ±5% of being uniform. The rotor support 128 may be attached to the support housing 134 with a sequence of nuts 135. FIG. 3 is a perspective view of the rotor support 128 and squeeze film damper 130, and FIG. 4 is an end view of the rotor support 128 shown in FIG. 3 with the forward ring 160 removed, according to an embodiment. As shown, a plurality of beams 164, 166, 168, 170, 172 (only five of which are labeled with reference numerals) are shown extending between the first and second rings 160, 162. Although sixteen beams are shown, it will be appreciated that the rotor support 128 may have fewer or more beams (e.g., between three and forty beams).

Each of the beams 164, 166, 168, 170, 172 provides an axial stiffness when an axial force is exerted on the first ring 160 along the first axis 132. Each beam 164, 166, 168, 170, 172 has a length "L" that extends parallel with the first axis 132 and a cross section having a height ("H") and a width ("W"), where each height extends parallel to a second axis 176 and each width extends parallel to a third axis 180. It will be appreciated that the first axis 132, the second axis 176, and the third axis 180 may be orthogonal to each other, in an embodiment. In other embodiment, the first, second, and third axes 132, 176, 180 may be non-orthogonal. Because axial stiffness is proportional to the length and area (H×W) of a beam, each beam 164, 166, 168, 170, 172 is configured such that the areas of an axial cross section of each beam (e.g., H×W) are substantially equal to each other.

Figure 6:
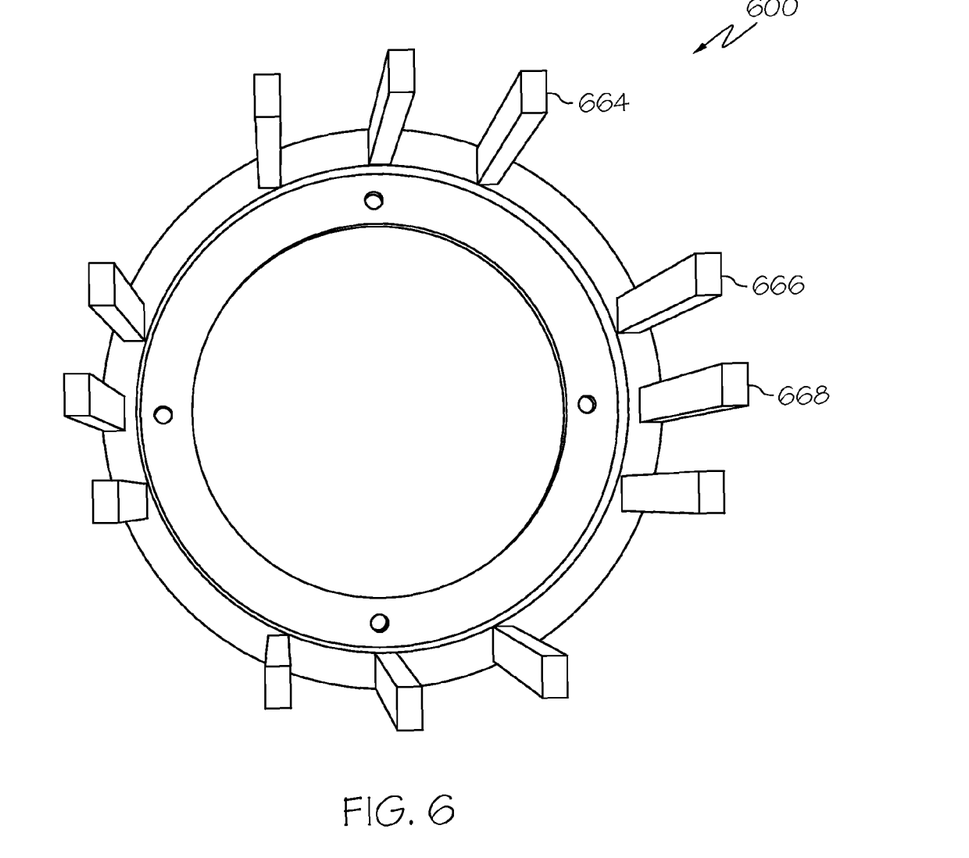
FIG. 6 is an end view of a rotor support with a forward ring of the rotor support removed, according to still another embodiment.

In various embodiments, the beams 164, 166, 168, 170, 172 have substantially similar cross-sectional areas and may be substantially uniformly spaced around the first ring 160. In an embodiment, the beams may not be uniformly spaced around the first ring. FIG. 6 is an end view of a rotor support 600 with a forward ring of the rotor support 600 removed, according to still another embodiment. Here, beams 664, 666, 668 are non-uniformly spaced around a first ring 660 of the rotor support 600. In any case, the particular spacing is determined based, in part, on the particular length, height, and width of each of the beams 164, 166, 168, 170, 172 and on whether the spacing allows the beams 164, 166, 168, 170, 172 to provide substantially uniform circumferential axial stiffness around the rotor support 128

As mentioned above, the rotor support 128 may also be configured to provide radial stiffness suitable for anisotropically damping the bearing assembly 126 (shown in FIG. 2). In this regard, each beam 164, 166, 168, 170, 172 is configured to have a height 174 extending parallel to the second axis 176 and a width 178 extending parallel to the third axis 180, where the height 174 of each beam is greater than the width 178 of each beam.

In an embodiment in which the rotor support 128 and beams 164, 166, 168, 170, 172 provide the above-described axial and radial stiffnesses, the height and width of a first beam 164 may be substantially equal to the height and the width of a second beam 166. In another embodiment, the heights of all of the beams 164, 166, 168, 170, 172 are substantially equal to each other and the widths of the beams 164, 166, 168, 170, 172 are substantially equal to each other. In still other embodiments, the height and width of a first beam 164 may not be substantially equal to the height and the width of a second beam 166, however, in such an embodiment, the areas of the axial cross-sectional shape of each beam 164, 166 are substantially equal. Additionally, as shown in FIGS. 3 and 4, all of the beams 164, 166, 168, 170, 172 may be oriented parallel to the first axis 132 in a similar manner. In an example, first ring 160 may have a diameter of about 10 cm and the beams 164, 166, 168, 170, 172 may each have a height of between about 0.25 cm and about 2.5 cm, a width of between about 0.10 cm and about 2.0 cm, and a length of between about 2.5 cm and about 15 cm.

Figure 7:
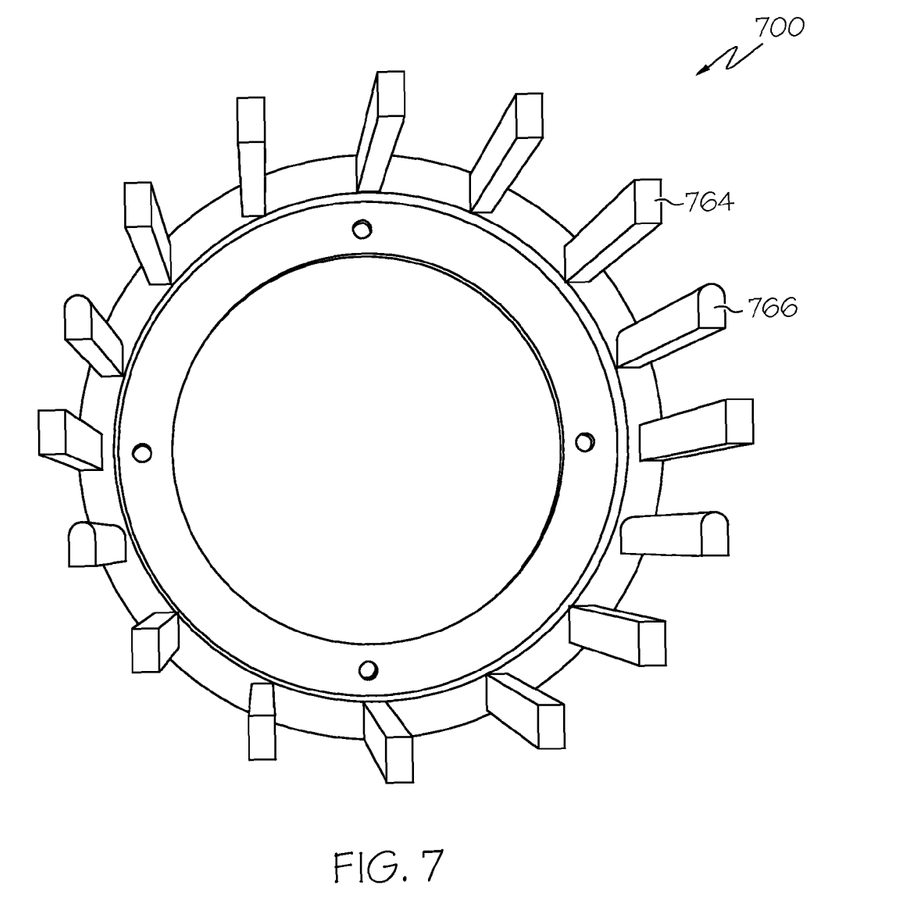
FIG. 7 is an end view of a rotor support with a forward ring of the rotor support removed, according to yet still another embodiment.

Although FIGS. 3 and 4 show each beam 164, 166, 168, 170, 172 as having the same axial cross-sectional shape, it will be appreciated that they may not have to be. FIG. 7 is an end view of a rotor support 700 with a forward ring of the rotor support 700 removed, according to still another embodiment. Here, the rotor support 700 includes beams 764, 766, with different cross sectional shapes. As alluded to above, embodiments having different cross sectional shapes have substantially equal axial cross-sectional areas. Additionally, although FIGS. 3 and 4 show the beams 164, 166, 168, 170, 172 as having uniform rectangular-shaped cross sections, one or more of the cross sections may alternatively be other shapes, such as hexagonal, octagonal, circular, oval, or other shapes.

A rotor support 128 has now been provided that may have improved damping capabilities over conventional rotor supports. Specifically, the substantially uniform axial cross-sectional areas of each beam 164, 166, 168, 170, 172 provides a more substantially uniform circumferential axial stiffness around the rotor support 128. With the addition of each beam having a height being greater than its width, both the axial and radial stiffnesses may be improved over conventional support. Additionally, the rotor support may be relatively inexpensive and simple to manufacture.

While the inventive subject matter has been described with reference to a preferred embodiment, it will be understood by those skilled in the art that various changes may be made and equivalents may be substituted for elements thereof without departing from the scope of the inventive subject matter. In addition, modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. A rotor support for disposal between a support housing and a bearing assembly of an engine, the rotor support comprising:
   a first ring disposed around a first axis;
   a second ring disposed around the first axis and separated from the first ring; and
   a plurality of beams extending between the first and the second rings, each beam configured to provide an axial stiffness, when an axial force is exerted on the first ring, and a radial stiffness, when a radial force is exerted on the first ring, wherein each beam has a height and a width, where the height is greater than the width, the height extending parallel to a second axis that is orthogonal relative to the first axis, the width extending parallel to a third axis that is orthogonal relative to the first axis and the second axis, wherein the beams are distributed around the first ring to provide a substantially uniform circumferential axial stiffness around the rotor support.

2. The rotor support of claim 1, wherein a height and a width of a first beam is substantially equal to a height and a width of a second beam.

3. The rotor support of claim 2, wherein the heights of the beams are substantially equal to each other and the widths of the beams are substantially equal to each other.

4. The rotor support of claim 1, wherein the plurality of beams are non-uniformly spaced around the first ring.

5. The rotor support of claim 1, wherein the plurality of beams are substantially uniformly spaced around the first ring.

6. The rotor support of claim 1, wherein a first beam has a first axial cross-sectional shape, and a second beam has a second axial cross-sectional shape, and the first axial cross-sectional shape is different from the second axial cross-sectional shape.

7. The rotor support of claim 1, wherein each beam has an axial cross sectional shape and the axial cross sectional shapes are substantially similar to each other.

8. The rotor support of claim 1, wherein the first axis, the second axis, and the third axis are orthogonal to each other.

9. The rotor support of claim 1, further comprising a damper between the rotor support and the support housing.

10. The rotor support of claim 9, wherein the damper comprises a squeeze film damper.

11. A rotating system for use in an engine, the system comprising:
- a rotor extending along an first axis;
- a bearing assembly mounted to the rotor;
- a support housing surrounding the bearing assembly; and
- a rotor support disposed between the support housing and the bearing assembly, the rotor support comprising:
  - a first ring disposed around the first axis;
  - a second ring disposed around the first axis and separated from the first ring; and
  - a plurality of beams extending between the first and the second rings, each beam configured to provide an axial stiffness, when an axial force is exerted on the first ring, and a radial stiffness, when a radial force is exerted on the first ring, wherein each beam has a height and a width, where the height is greater than the width, the height extending parallel to a second axis that is orthogonal relative to the first axis, the width extending parallel to a third axis that is orthogonal relative to the first axis and the second axis, wherein the beams are distributed around the first ring to provide a substantially uniform circumferential axial stiffness around the rotor support.

12. The system of claim 11, wherein the rotor support is further configured such that a height and a width of a first beam is substantially equal to a height and a width of a second beam.

13. The system of claim 11, wherein the heights of the beams are substantially equal to each other and the widths of the beams are substantially equal to each other.

14. The system of claim 11, wherein the plurality of beams are non-uniformly spaced around the first ring.

15. The system of claim 11, wherein the plurality of beams are substantially uniformly spaced around the first ring.

16. The system of claim 11, further comprising a damper between the rotor support and the support housing.

17. The system of claim 11, wherein a first beam has a first axial cross-sectional shape, and a second beam has a second axial cross-sectional shape, and the first axial cross-sectional shape is different from the second axial cross-sectional shape.

18. The system of claim 11, wherein each beam has an axial cross-sectional shape and the axial cross-sectional shapes are substantially similar to each other.

19. The system of claim 11, wherein the bearing assembly is a roller bearing.

20. The system of claim 11, wherein said second ring is off-centered relative to the support housing.

* * * * *